United States Patent [19]
Lombardi et al.

[11] Patent Number: 5,291,649
[45] Date of Patent: Mar. 8, 1994

[54] METHODS AND APPARATUS FOR PROCESSING STATORS

[75] Inventors: Massimo Lombardi; Sabatino Luciani, both of Florence, Italy

[73] Assignee: Axis USA, Inc., Marlborough, Mass.

[21] Appl. No.: 22,879

[22] Filed: Feb. 25, 1993

Related U.S. Application Data

[63] Continuation of Ser. No. 790,188, Nov. 7, 1991, abandoned, which is a continuation of Ser. No. 558,529, Jul. 27, 1990.

[51] Int. Cl.$^5$ ........................................... H02K 15/095
[52] U.S. Cl. ........................................ 29/596; 29/732; 242/1.1 E; 310/42; 310/71

[56] References Cited

U.S. PATENT DOCUMENTS

| | | | |
|---|---|---|---|
| 4,000,764 | 1/1977 | Reiger, Jr. ........................... | 140/113 |
| 4,038,573 | 7/1977 | Hillyer et al. ........................ | 310/71 |
| 4,074,418 | 2/1978 | Pearsall ............................... | 29/596 |
| 4,215,464 | 8/1980 | Miller .................................. | 29/596 |
| 4,553,319 | 11/1985 | Fischer et al. ....................... | 29/596 |
| 4,679,312 | 7/1987 | Nussbaumer et al. ................ | 29/596 |
| 4,713,883 | 12/1987 | Santandrea et al. .................. | 29/736 |
| 4,723,354 | 2/1988 | Moser .................................. | 29/596 |
| 4,856,180 | 8/1989 | Barrett et al. ........................ | 29/596 |
| 4,994,697 | 2/1991 | Santandrea ........................... | 29/596 X |

FOREIGN PATENT DOCUMENTS

| | | | |
|---|---|---|---|
| 64105 | 11/1982 | European Pat. Off. ....... | H02K 5/22 |
| 2617156 | 11/1976 | Fed. Rep. of Germany ......... | H02K 3/38 |
| 123252 | 12/1976 | German Democratic Rep. .... | H02K 3/50 |

*Primary Examiner*—Carl E. Hall
*Attorney, Agent, or Firm*—Robert R. Jackson

[57] ABSTRACT

An auxiliary member is provided with gripping means for temporarily securing the leads of wire coils wound around the poles of a stator. When the stator reaches the winding station of the manufacturing process, both the stator and the auxiliary member can be transferred to the winding machine, where the leads of the stator coils are gripped by the gripping means. When winding has been completed, the stator and the auxiliary member are transferred to a terminating station where the coil leads are finally anchored to the terminal receptacles of the stator.

15 Claims, 6 Drawing Sheets

METHODS AND APPARATUS FOR PROCESSING STATORS

This is a division, of application Ser. No. 07/790,138, filed Nov. 7, 1991, now abandoned, entitled METHODS AND APPARATUS FOR PROCESSING STATORS, which is a continuation of application Ser. No. 07/558,529, filed Jul. 27, 1990, now abandoned.

BACKGROUND OF THE INVENTION

This invention relates to methods and apparatus for processing stators for electric motors and similar machines such as generators. Although the invention is described herein in the context of its application to electric motor stators, it will be understood that it is equally applicable to other types of stators such as have been mentioned.

In a typical stator manufacturing process, wire is wound into coils around the poles of the stator body and the ends of the coil wires are subsequently anchored to the terminal receptacles of the stator. While the stator is in the winding station, the ends of the coil wires must temporarily be gripped to avoid loosening of the coils. The actual anchoring of the leads to the terminals is carried out by a separate machine which performs the termination cycle by removing the leads from the grippers and relocating them to the terminals.

It follows that the stator must be transported between the winding machine and the anchoring machine on some sort of transport device with the leads temporarily anchored to grippers which must be maintained in a fixed position in relation to the stator in order to avoid loosening of the coils.

In the past, the elements for temporarily gripping the ends of the coil wires have been provided on the pallets or other structures which support and/or convey the stators. Providing elements for temporarily holding the ends of the wire coils on the pallet or other coil supporting structure has a number of disadvantages. For one thing, these wire holding elements complicate the pallet, thereby increasing its cost. The presence of these wire gripping elements around the stator also makes it more difficult to place the stator on or remove the stator from the pallet. The stator handling elements which perform these tasks must be designed so that they do not interfere with the wire gripping elements. The need for wire gripping elements on the pallet may make it difficult or impossible to use the same pallet for stators of different size (e.g., different stack height). A substantial amount of wire may be needed to temporarily reach wire gripping elements on the pallet. This wire may have to be cut off and discarded when the wire is finally permanently terminated on the terminal board. The fact that the coil ends are temporarily attached to the pallet may make it more difficult or impossible to use certain permanent termination techniques which would otherwise be advantageous. For example, it may be difficult or impossible to employ permanent termination apparatus which requires removal of the stator from the pallet.

These problems were presented and discussed in Santandrea et al. U.S. Pat. No. 4,994,697, and Ser. No. 07/385,570, filed Jul. 26, 1989. Application U.S. Pat. No. 4,994,697 discloses terminal boards, which are insulating members typically placed on both axial ends of the main stator body, for temporarily holding the ends of the coil wires during and after winding the coils on the poles of a stator.

Using terminal boards having anchoring grippers to temporarily hold the ends of the coil wires in place is viable, but in some cases that method may have certain limitations. Because stators in use today often require that a greater number of coils be wound around the stator poles than in the past, the terminal boards do not always provide sufficient space to receive the grippers. For the same reason, the gripper position often cannot be chosen to suit an ideal wire manipulation.

In view of considerations such as the foregoing, it is an object of this invention to provide improved methods and apparatus for temporarily holding the ends of coil wires during and after winding the coils on the poles of a stator.

Another method of temporarily gripping the ends of coil wires during processing involves locating the grippers on the stator transport pallet. However, this requires precise positioning of the pallet at both the winding and the termination stations in order to process the stator without removing it from the pallet. Thus, it is another object of this invention to provide an alternative to locating the temporary grippers on the stator transport pallet.

SUMMARY OF THE INVENTION

These and other objects of the invention are accomplished in accordance with the principles of the invention by providing an auxiliary member which contains grippers required for temporarily anchoring the coil leads as a distinct element to be transported on the pallet together with the stator. When the stator reaches the winding station, both the auxiliary member and the stator can be removed from the pallet and transferred to the winding machine. After winding, the stator and the auxiliary member having the leads anchored to it can be repositioned on the pallet in order to transport them to a downstream termination station. At the termination station, the leads can be removed from the grippers and finally anchored to the terminal means of the stator.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
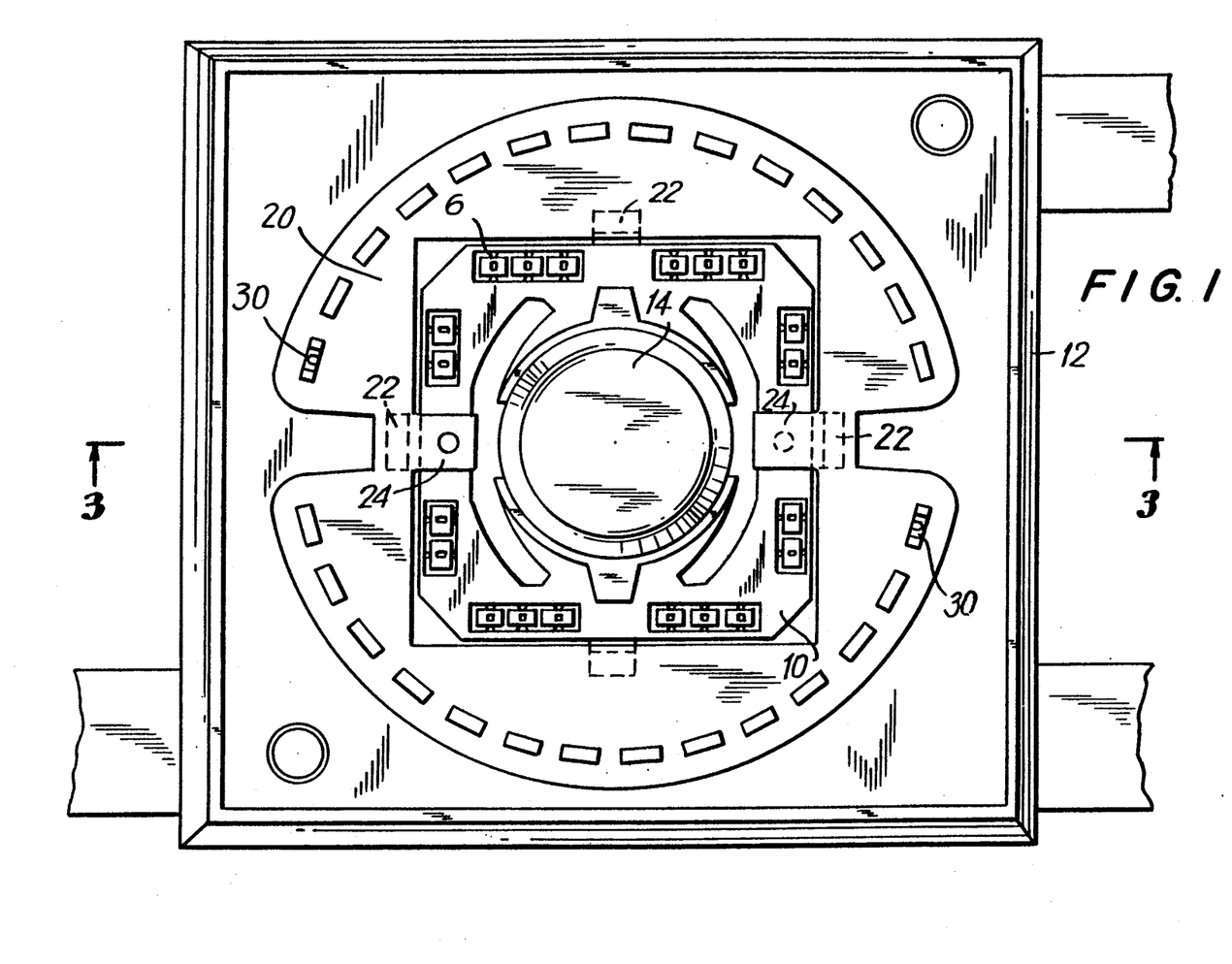
FIG. 1 is an axial end view of an illustrative embodiment of a stator and an auxiliary member constructed in accordance with the principles of this invention prior to winding coils on the stator poles.

FIG. 1 shows an auxiliary member 20 constructed in accordance with this invention and mounted on an axial end of stator 10. Stator 10 and auxiliary member 20 are seated on transport pallet 12, which is movable between stations on a manufacturing line.

Figure 3:
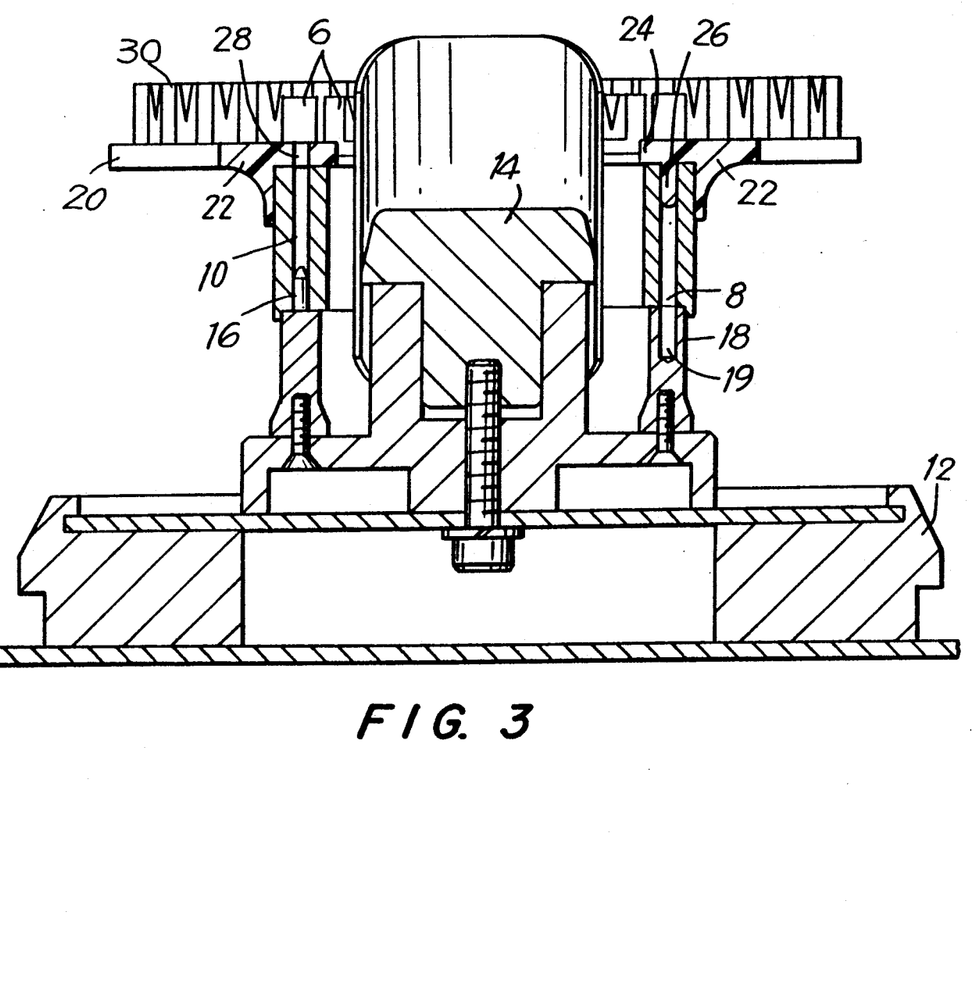
FIG. 3 is a sectional view taken along the line 3—3 in FIG. 1.

As can be seen more clearly in FIG. 3, stator 10 is centered on transport pallet 12 by means of central body 14 which is fixed to the base of pallet 12. Pallet 12 is also provided with pallet pin 16. Pallet pin 16 engages stator bore 8 such that rotation of stator 10 is prevented. Stator 10 is further supported by pallet peg 18, which is also fixed to the base of pallet 12.

Auxiliary member 20 is engageable with an axial end of the external surface of stator 10 by engagement with resilient protuberances 22 of auxiliary member 20. Protuberances 22 are further comprised of lips 24 and pins 26. Lip 24 of protuberance 22 is engaged with the end face of stator 10 and provides positioning of auxiliary member 20 along the longitudinal axis of stator 10. Pin 26 of protuberance 22 is seated in stator bore B in order to avoid rotation of auxiliary member 20. Pin 26 is also required to maintain alignment of auxiliary member 20 with stator 10 when auxiliary member 20 is automatically applied to stator 10.

Auxiliary member 20 is further provided with temporary anchoring grippers 30 which will hold the leads of the wire coils prior to termination. Grippers 30 are disposed on auxiliary member 20 along radii which have centers coinciding with the center of stator 10.

Preferably, auxiliary member 20 is of low cost and also of low weight. Most preferably, auxiliary member 20 is made from a plastic material by using a mold process.

Figure 2A:
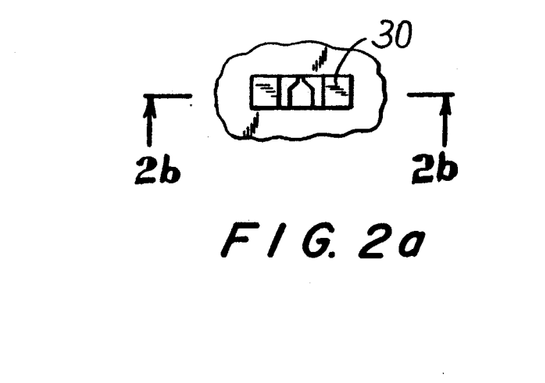
FIG. 2a is an enlargement of a portion of FIG. 1.
Figure 2B:
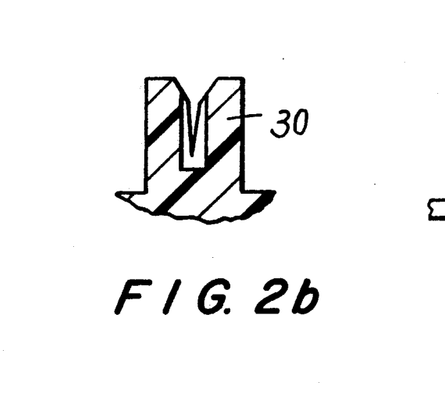
FIG. 2b is a sectional view taken along the line 2b—2b in FIG. 2a and 2b are sometimes referred to collectively herein as FIG. 2.

Preferably, each gripper 30 is of a resilient slot type, as shown in FIG. 2. However, grippers 30 can be of various constructions without departing from the scope of the invention. The orientation of the slot and the position of grippers 30 on auxiliary member 20 should be chosen to favor lead manipulation.

Figure 6:
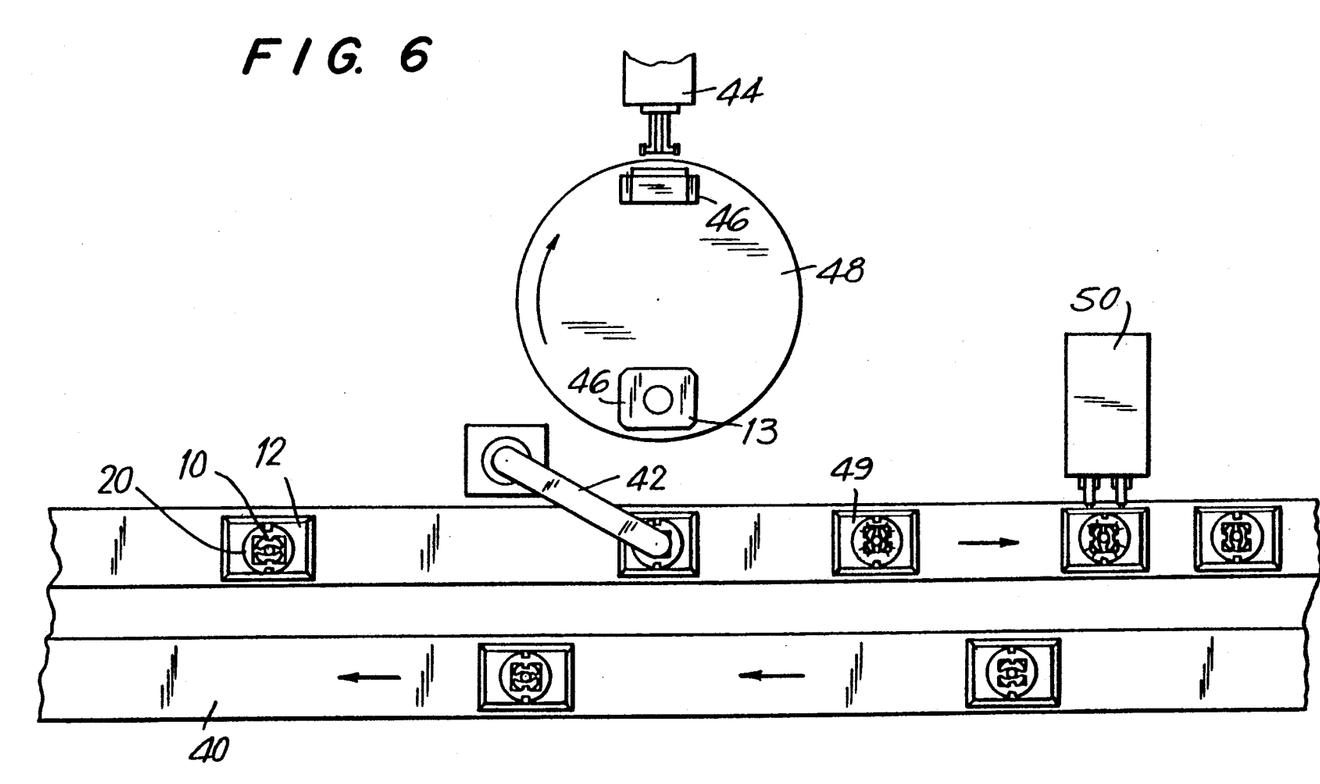
FIG. 6 is a top view of a layout of a line which is adapted for use with an auxiliary member of this invention.

FIG. 6 shows a line which is adapted for use with the methods and apparatus of this invention. Pallets 12 with stators 10 to be wound are transported along line 40 to a transfer device 42. Portions of transfer device 42 can be more clearly seen in FIG. 4. Stators 10 are provided with auxiliary members 20 attached to stators 10 as previously described.

Figure 4:
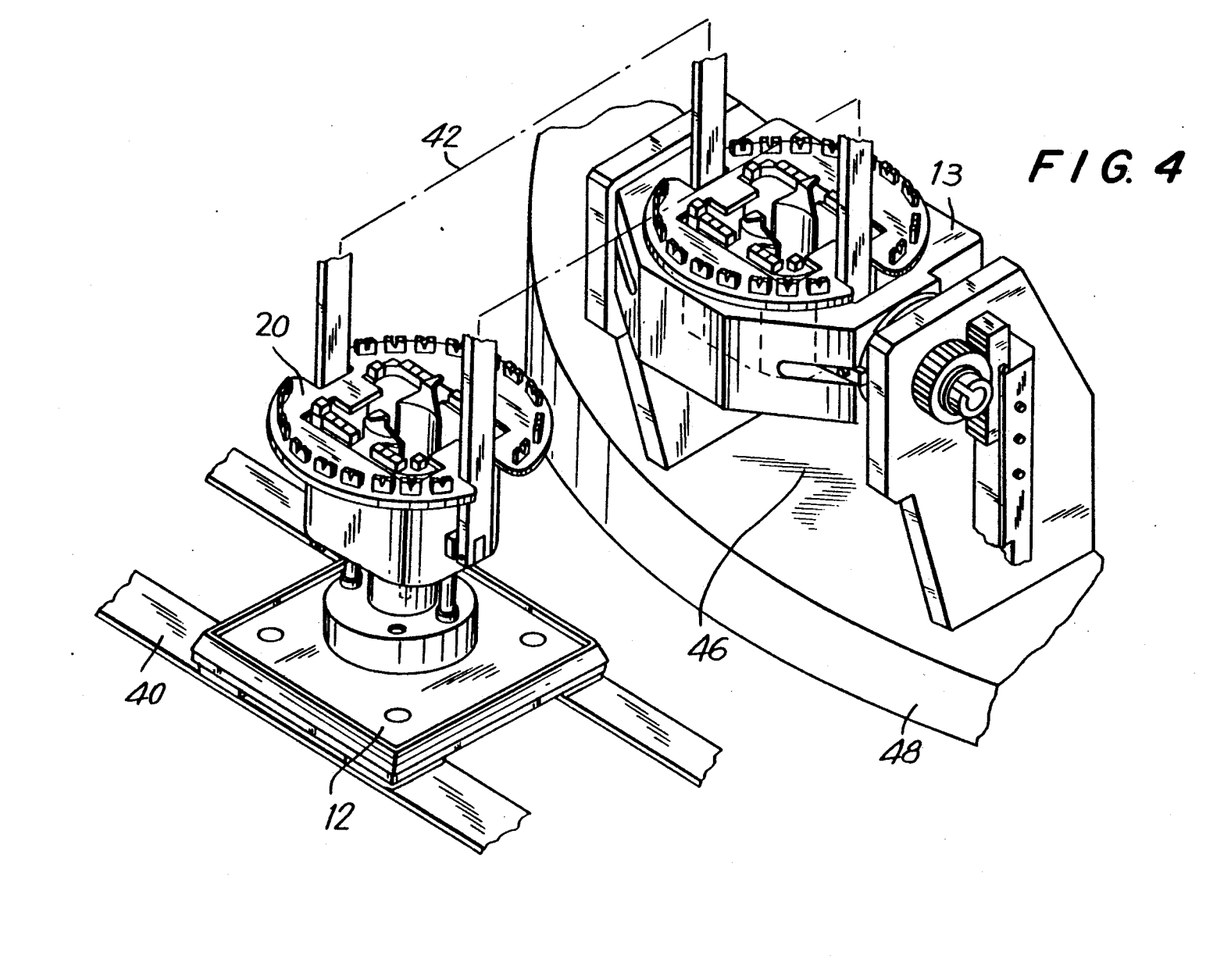
FIG. 4 is a partial perspective view of a device for transferring the stator and the auxiliary member to a rotating table for delivery to a winding machine.

Transfer device 42 removes auxiliary member 20 and stator 10 from pallet 12 and positions them in the housing 46 of table 48. Table 48 is rotated so that stator 10 and its relative auxiliary member 20 are positioned in front of winder station 44. Grippers 30 of auxiliary member 20 temporarily anchor the leads of the coil wires during and after winding.

After winding, table 48 is again rotated so that the wound stator and its relative auxiliary member 20 can be transferred back to line 40 by means of transfer device 42.

The coil leads remain temporarily anchored to auxiliary member 20 by grippers 30 as pallet 12 passes through station 49 along line 40. Then pallet 12 moves to anchoring station 50. At anchoring station 50, the leads are permanently anchored to terminal receptacles 6 of stator 10.

Once the entire processing of stator 10 has been completed, stator 10 together with auxiliary member 20 can be removed from pallet 12. Auxiliary member 20 can then be repositioned on empty pallet 12 by engaging pin 26 of protuberance 22 of auxiliary member 20 with bore 19 of pallet peg 18. During this repositioning, pallet pin 16 of pallet 12 is also engaged with bore 28 of auxiliary member 20. Pallet 12 loaded with auxiliary member 20 will be returned to a station where a stator to be wound can be loaded on pallet 12 and auxiliary member 20 can be replaced on stator 10.

Figure 5:
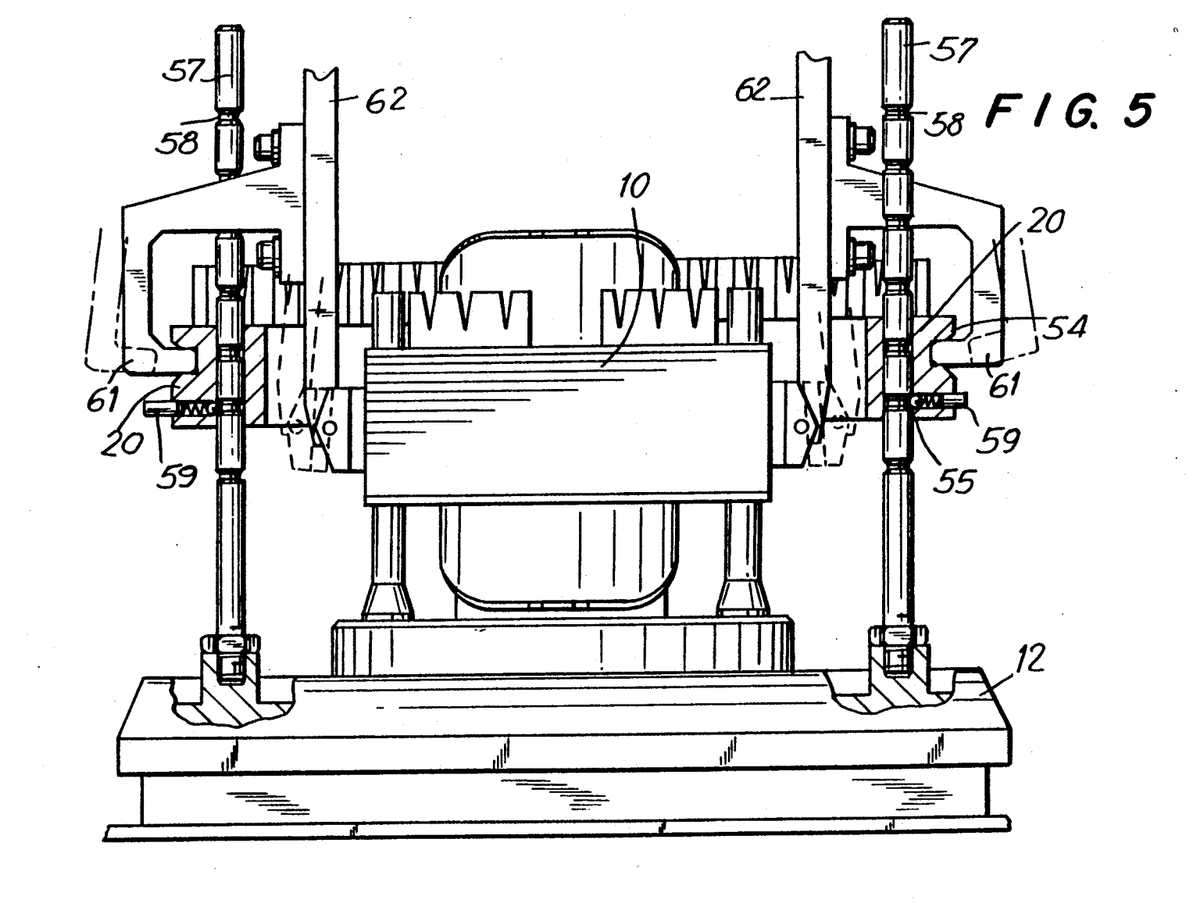
FIG. 5 is a side view, partly in section, of another embodiment of the auxiliary member of this invention.

Another embodiment of the present invention is shown in FIG. 5. In this embodiment, auxiliary member 20 is not connected to stator 10. This arrangement is useful in those cases where there is insufficient space on stator 10 for engagement with lips 24 of auxiliary member 20.

Referring now to FIG. 5, auxiliary member 20 is provided in the shape of a ring containing apertures 55. Apertures 55 are engaged with support posts 57 which are fixedly mounted on pallet 12. In order to secure auxiliary member 20 to support posts 57, auxiliary member 20 is provided with quick release means 59. Preferably, quick release means 59 is spring-loaded in order to insure maximum tension.

Each support post 57 is provided with a plurality of grooves 58. Thus, auxiliary member 20 can be positioned at differing heights along support post 57. This is useful when it is desired to process stators of varying heights using the methods and apparatus of the present invention.

In order to permit the stator to be transferred between the various stations of the manufacturing process, auxiliary member 20 is provided with circumferential groove 54. Circumferential groove 54 is engaged by arm tips 61 of transfer device arms 62. Once stator 10 and auxiliary member 20 have been disconnected from pallet 12 by transfer device arms 62, both of them can be transported to housing 46, similar to that shown in FIG. 4. In this embodiment, housing 46 will be provided with support bars similar to support posts 57 which can engage apertures 55 of auxiliary member 20 in order to maintain auxiliary member 20 in a fixed position on housing 46.

Figure 7:
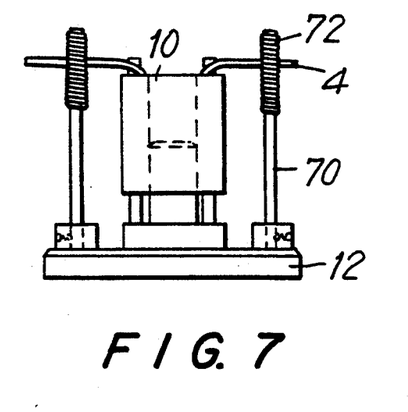
FIGS. 7–9 are side elevational views of alternative embodiments of auxiliary members in accordance with this invention.
Figure 8:
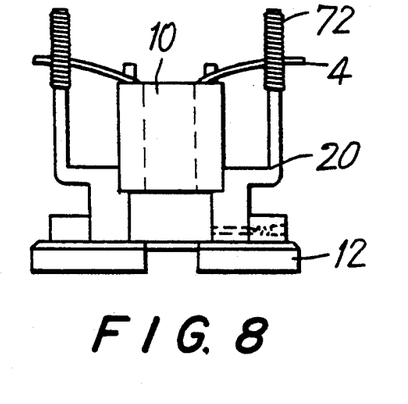
Figure 9:
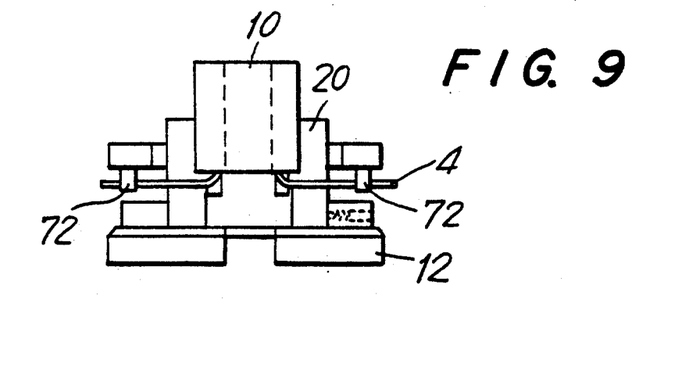

In addition to the embodiments already discussed, auxiliary member 20 may be provided in various embodiments without departing from the scope of this invention. FIGS. 7-9 illustrate three other embodiments.

Referring now to FIG. 7, auxiliary member 20 consists of pins 70 which are releasably fixed to pallet 12. Thus, auxiliary member 20 can be transferred along with stator 10 to housing 46. Auxiliary member 20 can be releasably fixed to housing 46 just as it is releasably fixed to pallet 12.

The upper portion of auxiliary member 20 is provided with preloaded spiral spring 72. Wire leads 4 can be temporarily anchored to auxiliary member 20 by extending spring 72 and inserting leads 4 in the resulting space between the turns of spring 72.

Because wire leads 4 can be inserted between any of the turns of springs 72, the embodiment of FIG. 7 is useful for processing stators of different heights.

Alternatively, auxiliary member 20 can be provided in winding station 44 and can be transferred to pallet 12 after winding. It can be discarded after use.

FIG. 8 shows another embodiment for auxiliary member 20. Here auxiliary member 20 is provided with a means for supporting stator 10 and spiral spring lead anchoring means 72 similar to those shown in FIG. 7. In this embodiment, auxiliary member 20 is releasably fixed to pallet 12 to facilitate transfer to and from the winding machine of winding station 44.

Yet another embodiment for auxiliary member 20 is shown in FIG. 9. Auxiliary member 20 supports stator 10 and contains lead anchoring means 72 for gripping wire leads 4. Stator 10 is supported on its face which contains terminal receptacles 6. Lead anchoring means 72 are kept at the same distance from the stator face in order to process stators of differing heights.

We claim:

1. Apparatus for temporarily securing wire leads while processing an annular stator having at least one pole on which a coil of wire having at least a start lead and a finish lead is wound as a plurality of turns around the pole, the apparatus comprising:

an annular auxiliary member removably engageable with an axial end of an outside surface of the stator, the member extending radially from the center of the stator and annularly around the stator at an axial location between the extreme axial ends of at least some of the turns of the coil, the member having a protuberance for engaging the axial end of the stator body, all portions of the auxiliary member being radially outside of all portions of the coil other than the start lead and the finish lead after the coil has been wound on the stator so that the coil does not prevent the entire auxiliary member from being removed from the stator as an annulus; and gripping means attached to the member for securing the wire leads during processing.

2. The apparatus defined in claim 1 wherein the gripping means comprises a plurality of slots disposed on the member along radii coinciding with the center of the stator.

3. The apparatus defined in claim 2 wherein each of the plurality of slots comprises a first edge and a second edge separated by a space for receiving the wire lead, the space being less than the diameter of the wire lead so that the lead is releasably retained in the space.

4. The apparatus defined in claim 1 wherein the member is substantially circular.

5. Apparatus for temporarily securing wire leads while processing an annular stator having at least one pole on which a coil of wire having at least a start lead and a finish lead is wound as a plurality of turns around the pole, the apparatus comprising:

an auxiliary member substantially in the shape of a ring adapted to be placed substantially concentrically around the outer periphery of the stator at an axial location between the extreme axial ends of at least some of the turns of the coil and having an aperture, the aperture capable of being fitted around a support post at varying heights, all portions of the auxiliary member being radially outside of all portions of the coil other than the start lead and the finish lead after the coil has been wound on the stator so that the coil does not prevent the entire auxiliary member from being removed from the stator as a ring; and gripping means attached to the member for securing the wire leads during processing.

6. The apparatus defined in claim 5 wherein the member is provided with a circumferential groove to allow for transfer to and from a winding station.

7. A method of processing a stator comprising the steps of:

providing a hollow annular stator body having a plurality of projecting poles;

mounting an annular auxiliary member having at least one gripping means adjacent at least one end of the stator body;

winding a coil of wire having start and finish leads around at least one of the stator poles after performing the mounting step and while the auxiliary member is mounted adjacent the stator body, the coil including a plurality of turns around the pole, all portions of the auxiliary member being radially outside of all portions of the coil other than the start lead and the finish lead after the coil has been wound on the stator so that the coil does not prevent the auxiliary member from being removed from the stator, the axial location of the auxiliary member being between the extreme axial ends of at least some of the turns of the coil;

temporarily securing at least one of the leads of the wire in the gripping means;

moving the stator with the auxiliary member still mounted adjacent the end of the stator body to a terminating station; and transferring the at least one lead from the gripping means to a terminal mounted on the stator and attaching the at least one lead to the terminal so that the auxiliary member can be removed as an annulus from adjacent the end of the stator body.

8. A method of processing a stator comprising the steps of:

providing a hollow annular stator body having a plurality of projecting poles;

removably mounting an annular auxiliary member having a plurality of gripping means on the stator body adjacent one end of the stator body;

temporarily securing a start lead of a coil of wire in the gripping means;

winding the coil of wire around at least one of the stator poles after temporarily securing the start lead in the gripping means and while the auxiliary member is mounted on the stator body, the coil comprising a plurality of turns of wire around the pole;

temporarily securing a finish lead of the coil of wire in the gripping means, all portions of the auxiliary member being radially outside of all portions of the coil other than the start lead and the finish lead after the coil has been wound on the stator so that the coil does not prevent the auxiliary member from being removed from the stator, the axial location of the auxiliary member being between the extreme axial ends of at least some of the turns of the coil; and removing the entire auxiliary member from the stator body as an annulus.

9. A method of processing a stator comprising the steps of:

providing a hollow stator body having a plurality of projecting poles;

providing an annular auxiliary member having a plurality of gripping means, the member being releasably mounted on a stator carrying device and moveable with the stator so that the auxiliary member can remain operatively adjacent to the stator;

temporarily securing a start lead of a coil of wire in the gripping means;

winding the coil of wire around at least one of the stator poles after temporarily securing the start lead in the gripping means and while the auxiliary member is operatively adjacent the stator, the coil comprising a plurality of turns of wire wound around the pole and the axial location of the auxiliary member being between the extreme axial ends of at least some of the turns of the coil;

temporarily securing a finish lead of the coil of wire in the gripping means, all portions of the auxiliary member being radially outside of all portions of the coil other than the start lead and the finish lead after the coil has been wound on the stator so that the coil does not prevent separation of the auxiliary member from the stator; and separating the stator body from the annular auxiliary member.

10. The method of claim 9 further comprising the steps of transferring the stator and the auxiliary member from the stator carrying device to a terminating station and transferring the at least one lead from the gripping means to a terminal mounted on the stator and attaching the at least one lead to the terminal.

11. Apparatus for temporarily securing wire leads while processing a stator having at least one pole on which a coil of wire having at least a start lead and a finish lead is wound as a plurality of turns around the pole, the apparatus comprising:

an annular auxiliary member, the member being releasably mounted on a stator carrying device and moveable with the stator so that the member can remain disposed in operative relationship to the stator, the operative relationship being such that the member extends annularly around the stator at an axial location which is between the extreme axial ends of at least some of the turns of the coil with the member being radially outside of all portions of the coil other than the start and finish leads so that the coil can be wound with the member in operative relationship to the stator and the coil does not prevent subsequent separation of the member as an annulus from the stator; and gripping means attached to the member for temporarily securing the wire leads during processing.

12. The apparatus as defined in claim 11 wherein the auxiliary member is mountable on the stator carrying device at varying heights.

13. Apparatus for temporarily securing wire leads while processing an annular stator having a central longitudinal axis and at least one pole on which a coil of wire having at least a start lead and a finish lead is wound by successively wrapping a plurality of turns of said wire around said pole, the stator being disposed on a pallet during at least part of the time between the beginning and ending of said processing; the apparatus comprising:

an auxiliary member having a plurality of pins, the member being releasably mounted on the pallet so that the pins project from the pallet, the member being movable with the stator during processing and separable from the stator and the pallet after processing; and gripping means attached to the pins adjacent the ends of the pins that are remote from the pallet when the auxiliary member is mounted on the pallet for securing the wire leads during processing, the pins being disposed on the auxiliary member so that the pins extend from the pallet along an outer surface of the stator at locations that are radially outside of the stator and angularly spaced around the stator, and the gripping means being disposed on the pins so that the gripping means are radially outside of the stator and not aligned parallel to said central longitudinal axis with any portion of the coil other than the wire leads.

14. The apparatus as defined in claim 13 wherein the gripping means comprises a plurality of spiral springs, each of which is wrapped about said end of a respective one of the pins.

15. The apparatus as defined in claim 13 wherein the member further comprises means for supporting the stator adjacent the ends of the pins remote from the gripping means.

* * * * *